United States Patent [19]

Kanda et al.

[11] Patent Number: 4,528,755
[45] Date of Patent: Jul. 16, 1985

[54] DIAL GAUGE

[75] Inventors: Tikara Kanda, Toyota; Toru Igarashi, Tochigi, both of Japan

[73] Assignees: Toyota Jidosha Kabushiki Kaisha, Toyota; Mitutoyo Mfg. Co., Ltd., Tokyo, both of Japan

[21] Appl. No.: 532,240

[22] Filed: Sep. 14, 1983

[30] Foreign Application Priority Data

Oct. 25, 1982 [JP] Japan .......................... 57-161508[U]

[51] Int. Cl.³ .............................................. G01B 3/22
[52] U.S. Cl. .................................. 33/172 R; 116/292
[58] Field of Search .................... 33/172 R, 147 R; 116/292

[56] References Cited

U.S. PATENT DOCUMENTS 1,966,424  7/1934  Ames .............................. 33/172 R
2,832,151  4/1958  Emery ............................. 33/172 A
3,046,931  7/1962  Beer .................................. 116/292
3,721,010  3/1973  Ristow .............................. 33/172 R Primary Examiner—Willis Little
Attorney, Agent, or Firm—Flynn, Thiel, Boutell & Tanis

[57] ABSTRACT

A dial gauge according to the present invention wherein moving ranges of a dial plate and a needle are determined to be within predetermined limits.

In this dial gauge, the dial plate is interposed between an inner frame and an outer frame in a manner to be rotatable relative to either the inner frame or the outer frame, and a projection formed on the undersurface of this dial plate is positioned within a groove formed on the top face of an outer frame mounting portion of the inner frame to thereby control the dial plate in its moving range. On the other hand, a slot is formed in a gear for enlarging and transmitting a movement of a spindle in the circumferential direction of the gear and the forward end of a pawl affixed to the inner frame is loosely inserted into the slot to thereby restrict the needle in its turning to less than one turn.

5 Claims, 7 Drawing Figures

DIAL GAUGE

FIELD OF THE INVENTION

This invention relates to dial gauges and more particularly to improvements in an adjusting mechanism of a dial plate in a dial gauge.

BACKGROUND OF THE INVENTION

In general, dial gauges are used to make comparisons and measurements within a very small range. To avoid misreading the graduation, there has already been proposed a so-called one turn type dial gauge wherein a needle is limited to less than one turn in its range of rotation. Such a one turn type dial gauge can avoid misreading the graduation and be convenient to make comparisons and measurements, in that the needle is adapted to turn through a predetermined angle within one turn, normal and reverse graduations are provided which divide the range of rotational angle of the needle into two, and an ungraduated portion is provided between the normal and reverse graduations.

However, with the one turn type dial gauge as described above, when the dial plate is mounted to an inner frame in a manner to be unlimitedly rotatably adjustable, the needle may reach the normal or the reverse graduation going beyond the ungraduated portion depending upon a zero adjustment position at the time of setting the dial gauge. Therefore, to obviate such disadvantage as described above, the present applicants have proposed such a dial gauge that the dial plate and the needle are determined in their range of turning in such a manner that the needle may not go beyond the ungraduated portion of the dial plate (Refer to Japanese Utility Model "Kokai" (LaidOpen) No. 6894/1980). This invention is one in which the proposed dial gauge has been further developed. More specifically, in the proposed dial gauge, the dial plate is unrotatably secured to an outer frame, and the outer frame secured thereto with the dial plate is controlled in turning with respect to the inner frame, whereby the dial plate is controlled in turning. Hence, such disadvantages have been presented by the proposed dial gauge that it is necessary to very strictly control and adjust a positional relationship in mounting between the outer frame and the dial plate, and further, positional relationship in mounting between parts other than the outer frame and the dial plate at the time of assembling, and moreover, once the dial unit is assembled, it becomes difficult to make fine adjustment and disassembling. Furthermore, the construction as a whole has been complicated.

To state more detailedly, the dial gauge must be assembled with all of the parts being registered with one another in such a manner that the dial plate must be solidly secured to the outer frame in a predetermined positional relationship therebetween, while, the needle must be held in a predetermined positional relationship with a spindle and an enlarging-transmitting mechanism for enlarging and transmitting a displacement of the spindle. For example, if predetermined marks are not put on the dial plate and the outer frame in relation to the inner frame, then an improper positional relationship between the needle and the range of turning control occurs from one dial gauge to another, and, in some cases, the dial gauge may be disadvantageously assembled with the needle deviating from the range of turning control. Moreover, once the dial gauge is assembled, it has been very difficult to make fine adjustments and disassembling.

SUMMARY OF THE INVENTION

The present invention has as its object the provision of a one turn type dial gauge capable of being readily assembled, finely adjusted, and being simplified in construction as a whole.

To achieve the above-described object, the present invention contemplates that, in a one turn type dial gauge wherein an axial displacement of a spindle is enlarged, transmitted and converted into a rotary motion of a needle through an enlarging-transmitting mechanism and the axial displacement of the spindle is displayed by the needle and a dial plate indicated by the needle, the dial plate is interposed between an inner frame for axially displaceably supporting the spindle and an outer frame rotatably coupled onto the inner frame in a manner to be rotatable relative to either the inner frame or the outer frame, the dial plate is brought into pressing contact with the outer frame by a biasing means, a turning range control portion is provided on one of the dial plate and the inner frame over a predetermined range along the turning direction of the dial plate, a projection is provided on the other of the dial plate and the inner frame in a manner to be positioned within the turning range control portion, and the dial plate is controlled in its turning to a predetermined range relative to the inner frame by both the turning range control portion and the projection. In other words, the dial plate is controlled in its turning relative to the inner frame in the static state, and the dial plate is adapted to turn integrally with the outer frame within this turning control range, but to turn relative to the outer frame beyond the turning control range, so that the necessity for troublesome registration of the parts with one another in mounting the dial plate and the outer frame to the inner frame can be eliminated and fine adjustments after assembling can be readily effected.

DETAILED DESCRIPTION OF THE PREFERRED EMBODIMENT

Figure 1:
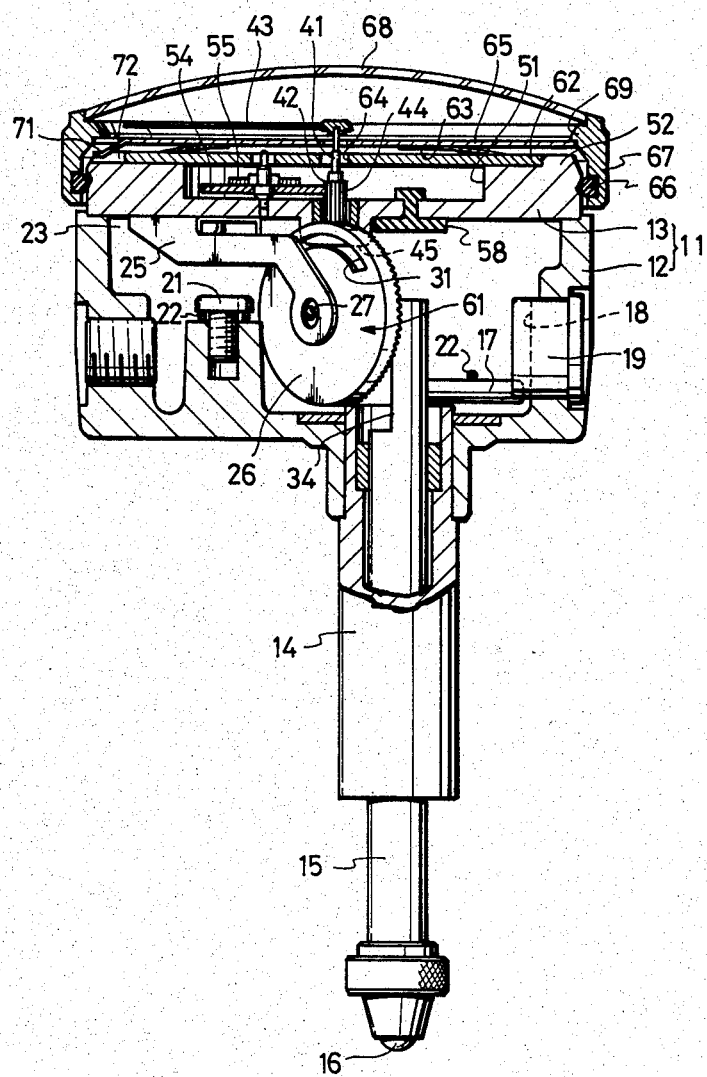
FIG. 1 is a side view, partially cut away, showing the general arrangement of one embodiment of the dial gauge according to the present invention.
Figure 2:
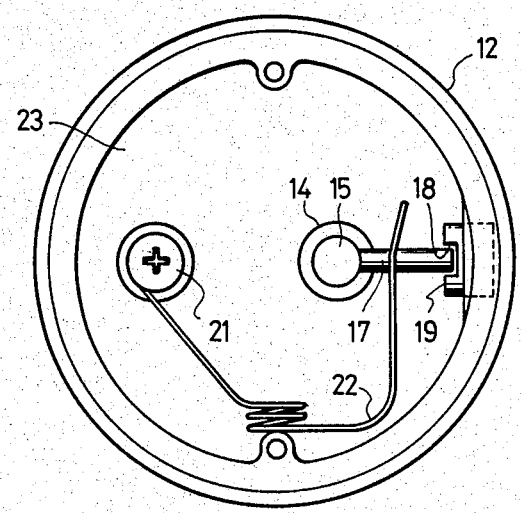
FIG. 2 is a plan view showing the above embodiment with an outer frame mounting portion being removed from the inner frame.
Figure 3:
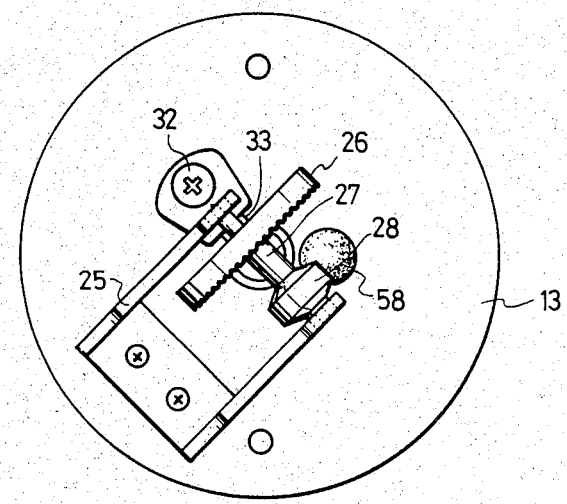
FIG. 3 is a bottom view showing the outer frame mounting portion in the above embodiment.

Description will hereunder be given of one embodiment of the present invention with reference to the drawings.

One embodiment of the dial gauge according to the present invention is shown in FIGS. 1 through 7. In the drawings, an inner frame 11 comprises a spindle support portion 12 being of a substantially round tray shape and an outer frame mounting portion 13 being of a thick-wall disc shape and threadably fixed onto the top end surface of the spindle support portion 12.

A stem 14 is projected from the bottom end face of the spindle support portion 12 as shown in FIG. 1. A spindle 15 is axially displaceably supported on the spindle support portion 12 through this stem 14. A measuring element 16 is provided on the forward or outer end of the spindle 15. On the other hand a guide pin 17 is projected from one side surface of the proximal end of the spindle 15 disposed in the spindle support portion 12. The forward end of this guide pin 17 is slidably coupled into a guide groove 18 being in parallel to the axial direction of the spindle 15. This guide groove 18 is formed on one side surface of a guide member 19 solidly secured to the spindle support portion 12. The guide pin 17 cooperates with the guide groove 18 in preventing rotation of the spindle 15. Abutting against the guide pin 17 is one end of a coil spring 22, the other end of which is secured to the spindle mounting portion 12 through a screw 21 (Refer to FIG. 2). The spindle 15 is biased toward the measuring element 16 by the coil spring 22, while being supported by the stem 14.

The other frame mounting portion 13 is fixed to the top end surface of the spindle support portion 12 in a manner to close a vacant space 23 in the spindle support portion 12, and the end face (rear surface) of the outer frame mounting portion 13 which faces the vacant space 23 has secured thereto a crown gear 26 through a bearing member 25 being of a substantially gate shape. The crown gear 26 is fixed to a rotary shaft 27, the opposite ends of which are rotatably supported by the bearing member 25. Secured to this rotary shaft 27 in addition to the crown gear 26 is a cam member 28, whereby the cam member 28 and the crown gear 26 are rotatable in synchronism with each other at all times (Refer to FIG. 3).

Figure 4:
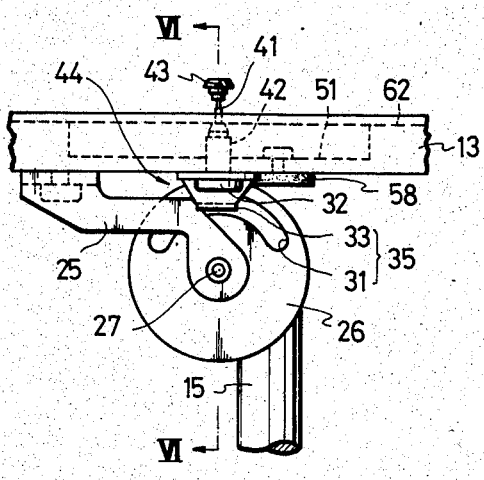
FIGS. 4 and 5 are side views showing the essential portions of the above embodiment at angles different from FIG. 1.
Figure 5:
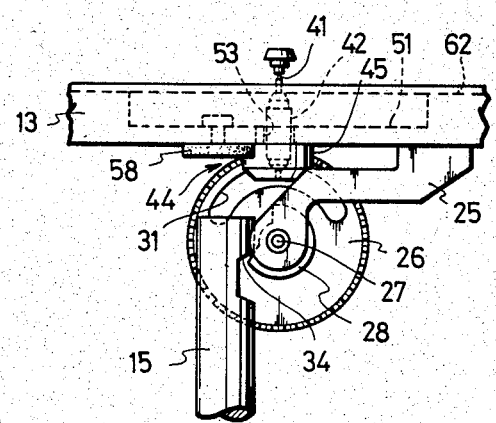

As shown in FIG. 4, provided in a disc portion of the crown gear 26 is a turning range control slot 31 being of a circularly arcuate shape in the circumferential direction of the crown gear 26 over a predetermined range. The forward end portion of a pawl member 33 secured to the rear surface of the outer frame mounting portion 13 through a mounting screw 32 is loosely inserted into this turning range control slot 31. The pawl member 33 cooperates with the turning range control slot 31 in controlling the crown gear 26, i.e., the cam member 28 in the range of turning. In other words, the control slot 31 and the pawl member 33 constitute a control means 35 for controlling the cam member 28 in its range of turning. As shown in FIG. 5, the cam member 28 is engaged with the spindle 15 at a cut-away portion 34 formed in the proximal end portion of the spindle 15, whereby an axial displacement of the spindle 15 is converted into a rotary motion of the cam member 28, i.e., the crown gear 26. In this case, the axial displacement value of the spindle 15 is in direct proportion to the amount of rotation (angle of rotation) of the crown gear 26. The crown gear 26 is brought into meshing engagement with a pinion 42 formed integrally with the outer peripheral portion of a pinion shaft 41, and a needle 43 is secured to the forward end of the pinion 41 in a manner to be rotatable integrally with the pinion shaft 41. Here, the crown gear 26 and the pinion 42 constitute a gear mechanism 44 wherein the turning of the cam member 28 is converted into the rotary motion of the needle 43.

Figure 6:
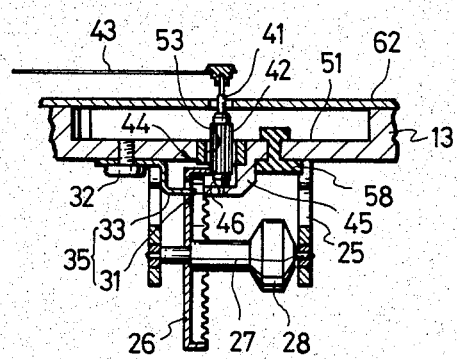
FIG. 6 is a sectional view taken along the line VI—VI in FIG. 4.

The other end of the pinion shaft 41 is rotatably supported by a bearing projection 45, which is projected toward the vacant space 23 at the central portion of the spindle support portion 12 in a manner to be integral with the outer frame mounting portion 13 and in a bottomed small column shape (Refer to FIG. 6). A recess 46 is formed at one side of the bearing projection 45 in such a manner that the peripheral wall of the bearing projection is cut away. The pinion 42 is exposed to the vacant space 23 from this recess 46, and the pinion 42 and the crown gear 26 are in meshing engagement with each other in this recess 46.

A shock-absorbing rubber 58 is fastened to the bottom end surface of the outer frame mounting portion 13 near the bearing projection 45 in a manner to be able to contact the top end of the spindle 15, so that this shock-absorbing rubber 58 can absorb a shock when the spindle 15 runs into the outer frame mounting portion 13.

Figure 7:
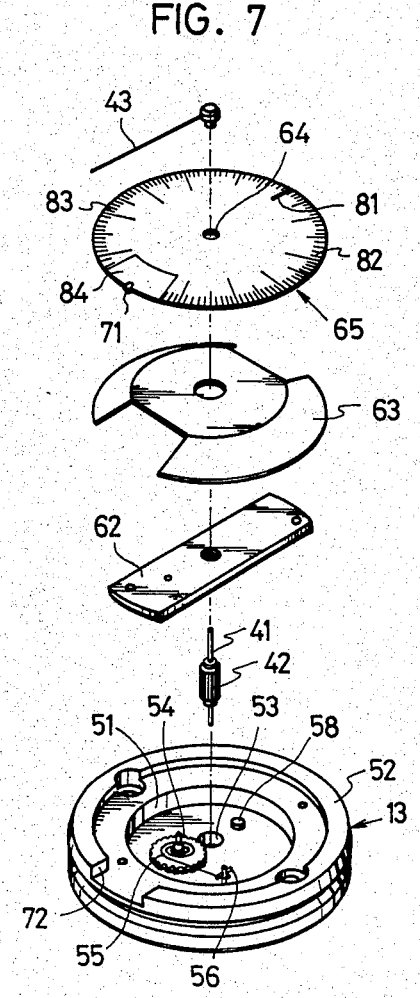
FIG. 7 is an exploded perspective view showing the arrangement of the outer frame mounting portion in the above embodiment.

As shown in FIG. 7, on the top end face of the outer frame mounting portion 13, a circular recess 51 is formed at the inner portion and a circumferential ridge 52 is formed in the peripheral edge portion, whereby the outer frame mounting portion 13 is generally formed into a substantially shallow, stepped receiving tray shape. A center hole 53 is formed at the central portion of the circular recess 51 and this center hole 53 opens into the bearing projection 45. Rotatably inserted into the center hole 53 is the pinion 42 which is brought into meshing engagement with a backlash preventive gear 54. The backlash preventive gear 54 is rotatably supported in the circular recess 51, and one end of a hair spring 55 which serves as a biasing means is solidly secured to a rotary shaft of the backlash preventive gear 54, the other end of the hair spring 55 being affixed to the circular recess 51, i.e., the outer frame mounting portion 13, through a mounting shaft 56, and the pinion 42 brought into meshing engagement with the backlash preventive gear 54 by the hair spring 55 biasing it in a direction in which the cam member 28 is engaged with the spindle 15, the cam member 28 being interlocked with the pinion 42 through the crown gear 26 and the rotary shaft 27. Here, the gear mechanism 44 consisting of the pinion 42 and the crown gear 26, the hair spring 55, the cam member 28 and the control means 35 constitute an enlarging-transmitting mechanism 61 for enlarging and transmitting an axial displacement of the spindle 15 and converting the same into a rotary motion of the needle 43.

Mounted onto the top end face of the outer frame mounting portion 13 is a bearing plate 62 rotatably supporting the top end portion of the pinion shaft 41 and the top end portion of the backlash preventive gear 54, respectively. A sheet spring 63 like a belleville spring as which serves a biasing means is fitted to the bearing plate 62 from above and a dial plate 65 is fitted thereto further from above, the dial plate 65 being formed at the center thereof with an insert hole 64 for receiving therethrough the pinion shaft 41.

Detachably coupled onto the outer frame mounting portion 13 through a rubber ring 66 is an outer frame 67 (Refer to FIG. 1). The outer frame 67 is formed to be a substantially short length cylinder shape being provided at one end thereof with a circular transparent cover 68 and at the inner circumference thereof with a ridge 69 over the total circumferential direction. The top end face of the dial plate 65 is abutted against the bottom end face of this ridge 69 by a biasing force of the sheet spring 63. A portion of the dial plate 65 is plastically deformed to form a projection 71 at a predetermined position of the peripheral edge portion of the dial plate 65, which is abutted against the outer frame 67. The circumferential ridge 52 is generally formed into a substantially C-shape, and a turning range control groove 72 which serves as being the turning range control portion is formed by a cut-away portion of the circumferential ridge 52 over a predetermined range along the circumferential direction (turning direction) of the dial plate 65, whereby, when the outer frame 67 is coupled onto the outer frame mounting portion 13, the projection 71 of the dial plate 65 is adapted to be positioned within the turning range control groove 72.

A zero base line 81 is marked on the dial plate 65, a normal graduation 82 and a reverse graduation 83 are given at opposite sides of the zero base line, respectively, and an ungraduated portion 84 extending over substantially the same range as the turning range control groove 72 is provided at the sides of threshold values of the respective graduations 82 and 83.

Description will hereunder be given of the method of assembling this embodiment.

Previously, the spindle 15 and the coil spring 22 are secured to the spindle support portion 12, and the bearing member 25 holding the crown gear 26 and the cam member 28 and the backlash preventive gear 54 having the hair spring 55 are mounted to the outer frame mounting portion 13, respectively.

Subsequently, in a wound-up state of the hair spring 55, the pinion 42 is brought into meshing engagement with the backlash preventive gear 54, whereby the pinion shaft 41 is inserted into and supported by the bearing projection 45. In this state, the bearing plate 62 is mounted to the outer frame mounting portion 13, whereby the pinion shaft 41 and the rotary shaft of the backlash preventive gear 54 are rotatably supported by the bearing plate 62 and the outer frame mounting portion 13, respectively. Thereafter, the sheet spring 63 is rested on the outer frame mounting portion 13, and the dial plate 65 is further rested on the sheet spring 63 in such a manner that the projection 71 is positioned within the turning range control groove 72. The needle 43 is secured to the forward end of the pinion shaft 41 projecting from the insert hole 64 of the dial plate 65 in such a manner that the tip end of the needle 43 indicates the projection 71 of the dial plate 65 or substantially the central portion of the turning range control groove 72, or substantially the central portion of the ungraduated portion 84 of the dial plate 65.

On the other hand, the outer frame mounting portion 13 is rested on the spindle support portion 12 and threadably fastened thereto while the cam member 28 is engaged with the spindle 15, with the cam member 28 being put into the cut-away portion 34 of the spindle 15. Thereafter, the outer frame 67 is pressingly coupled onto the outer frame mounting portion 13 through the rubber ring 66, thus completing the assembling operation.

Description will now be given of the operation of this embodiment.

The present dial gauge is mounted to a fixture or the like, not shown, in a manner to be adjustable in its mounting position, and the measuring element 16 is brought into contact with a reference body, not shown, so as to be set at a reference position of mounting. In this case, if the measuring element 16 is in a state of being in contact with the reference body, the present dial gauge is set in such a manner that the needle 43 substantially indicates the zero base line 81 of the dial plate 65. The above-described setting makes it possible that the reference position obtained by the reference body is positioned at the substantially central position of the total stroke of the spindle 15.

In this stage, the needle 43 need not accurately coincide with the zero base line 81, or zero adjustment is not required for the dial plate 65. After the present dial gauge is set on the fixture, zero adjustment of the dial gauge 65 is conducted. In order to conduct the zero adjustment of the dial plate 65, the outer frame 67 should be grasped for turning it. When the outer frame 67 is turned, the dial plate 65 brought in pressing contact with the outer frame 67 by the sheet spring 63 is turned along with the outer frame 67. The turning range of the dial plate 65 is limited within the turning range control groove 72 because the projection 71 is positioned within the turning range control groove 72. Even if the turning range is limited, the present dial gauge is or should be set onto the fixture so that no trouble may be caused for zero adjustment.

The turning operation of the dial plate 65 is effected through the turning of the outer frame 67. Even if the outer frame 67 is turned beyond necessity, the dial plate 65 can turn relative to the inner frame 11 only within a controlled range because the turning of the dial plate 65 relative to the inner frame 11 is limited by the projection 71 and the turning range control groove 72 within the range of the turning range control groove 72. In consequence, the needle 43 is adapted to indicate the total regions of the normal graduation 82 and the reverse graduation 83, respectively, and further is transferred to the ungraduated portion 84 from the respective threshold values, but never reaches the reverse graduation 83 or the normal graduation 82 by going over this ungraduated portion 84.

The above-described embodiment is advantageous in the following.

It suffices that the outer frame 67 is pressingly coupled onto the inner frame 11 after the dial plate 65 is oriented in such a manner that the projection 71 of the dial plate 65 is positioned within the turning range control groove 72 of the inner frame 11. Hence, in assembling, necessity is eliminated for strictly controlling and adjusting the positional relationship in mounting such for example as registering the outer frame 67 with the dial plate 65. In consequence, such an advantage can be offered that the assembling operation is quickly facilitated to a considerable extent. Moreover, fine adjustments and disassembling can be readily conducted even after the dial gauge is assembled.

As for machining, only the milling of the outer frame mounting portion 13 and the machining of the projection 71 of the dial plate 65 are required, the number of parts as a whole is minimized, the construction is simplified and rugged, and moreover, the dial gauge is produced at a low cost.

For example, in the case where the dial plate 65 is solidly secured to the outer frame 67 and the outer frame 67 is to be controlled in turning relative to the inner frame 11 so as to control the dial plate 65 in turning, the mechanism for controlling the outer frame 67 in turning relative to the inner frame 11 may be exposed to outside. In contrast thereto, in the present dial gauge, there is adopted such a construction that the projection 71 and the turning range control groove 72 are completely closed in the outer frame 67 and the inner frame 11, which is preferable from various viewpoints such as handling, outer appearance or dust excluding effect.

In fact, the present invention need not necessarily be limited to the construction in which the turning range control groove 72 which serves as the turning range control portion is provided on the outer frame mounting portion 13 of the inner frame 11 and the projection 71 is formed on the dial plate 65. Such a construction may be adopted so that, for example, a cut-away portion as being the turning range control portion is formed on the outer peripheral edge of the dial plate 65 over a predetermined range and a projection directed toward the inner periphery of the inner frame 11 is positioned within this cutaway portion, or that a circular arcuate slot serving as the turning range control portion is provided in the predetermined portion of the dial plate 65 over a predetermined range in the circumferential direction of the dial plate 65 and a projection such as a pin positioned in this circular arcuate slot is projected from the inner frame 11.

There has been adopted such an arrangement that the dial plate 65 is brought into pressing contact with the outer frame 67 by the sheet spring 63 like the belleville spring, but, this may be replaced by an arrangement in which the dial plate 65 is brought into pressing contact with the outer frame 67 by a sheet spring of a shape other than the belleville spring or a spring other than a sheet spring, i.e., a coil spring or the like. However, the adoption of the sheet spring 63 is advantageous in that the sheet spring is small in thickness, so that the construction becomes simplified and the assembling work is facilitated.

In the above embodiment, there has been shown a so-called back plunger type dial gauge, but, this may be replaced by an ordinary dial gauge in which the spindle 15 is provided in the diametrical direction of the inner frame 11. Furthermore, the axial displacement of the spindle 15 has been transmitted to the needle 43 through the cam member 28, but, a dial gauge having an ordinary enlarging-transmitting mechanism may be adopted in which a rack is formed on the spindle and a spur gear engageable with this rack is provided. The cam member 28 has been controlled by the control means 35 for controlling the turning range of the cam member 28. In other words, the turning range of the needle 43 has been actively restricted to less than one turn by the control means 35. However, in order to restrict the turning range of the needle 43 to less than one turn, the stroke of the spindle 15 may be controlled for example, or, without actively taking up the control means, such an arrangement may be adopted that the cam member 28 is engaged with the spindle 15 only when the needle 43 indicates the graduation within a range of less than one turn, and the engagement is released beyond the range, whereby the axial displacement of the spindle 15 is not transmitted to the needle 43.

Furthermore, the inner frame 11 need not necessarily be divided into two sections including the spindle support portion 12 and the outer frame mounting portion 13, but may be integrally formed. However, the adoption of a two section construction makes it possible to facilitate the assembling work and adjustments.

As has been described above, the present invention can provide a one turn type dial gauge capable of being readily assembled, finely adjusted and having a simplified construction as a whole.

What is claimed is:

1. A one turn type dial gauge comprising:
   casing including an inner frame for axially displaceably supporting a spindle having at one end thereof a measuring element and an outer frame rotatably coupled onto said inner frame;
   a dial plate interposed between said inner frame and said outer frame in a manner to be rotatable relative to said inner frame and said outer frame, brought into pressing contact with said outer frame through a biasing means and partially provided thereon with an ungraduated portion;
   a means for controlling the turning range of said dial plate relative to said inner frame, including a groove formed on one of said dial plate and said inner frame over a predetermined range in the turning direction of said dial plate and a projection formed on the other of said dial plate and said inner frame and slidably disposed in said groove;
   a gear mechanism for converting an axial displacement of said spindle into a rotary motion, including a gear supported coaxially with a cam member driven by said spindle and a pinion engaged with said gear and provided at one end thereof with a needle;
   a control means for restricting a range of turning of said needle to less than one turn, including a slot provided in said gear over a predetermined range in the circumferential direction of said gear and a pawl, the forward end of which is loosely inserted into said slot and the proximal end of which is solidly secured to a portion of said inner frame;
   a mechanism for preventing rotation of said spindle, including a pin projected from said spindle in said inner frame and a guide member for guiding said pin only in the axial direction of said spindle; and
   a spring for biasing said spindle in a direction causing said spindle to project progressively farther from said inner frame.

2. A dial gauge as set forth in claim 1, wherein said biasing means comprises a sheet spring.

3. A dial gauge as set forth in claim 1, wherein said inner frame comprises a substantially cylindrical spindle support portion and an outer frame mounting portion solidly secured to said spindle support portion in a manner to close one end face of said spindle support portion, and wherein said outer frame is rotatably supported on the outer peripheral surface of said outer frame mounting portion.

4. A dial guage as set forth in claim 3, wherein said pinion is engaged with a further gear rotatably supported on said outer frame mounting portion, said further gear being provided with a hair spring for biasing said further gear to engage said pinion.

5. A dial gauge as set forth in claim 1, wherein said spring for biasing said spindle is solidly secured at one end thereof in said inner frame and engaged at the other end with said pin.

* * * * *